Feb. 21, 1956 — G. M. RUSSELL — 2,735,577
SHIELD FOR PUMP CRADLES
Filed Sept. 23, 1952 — 2 Sheets-Sheet 1
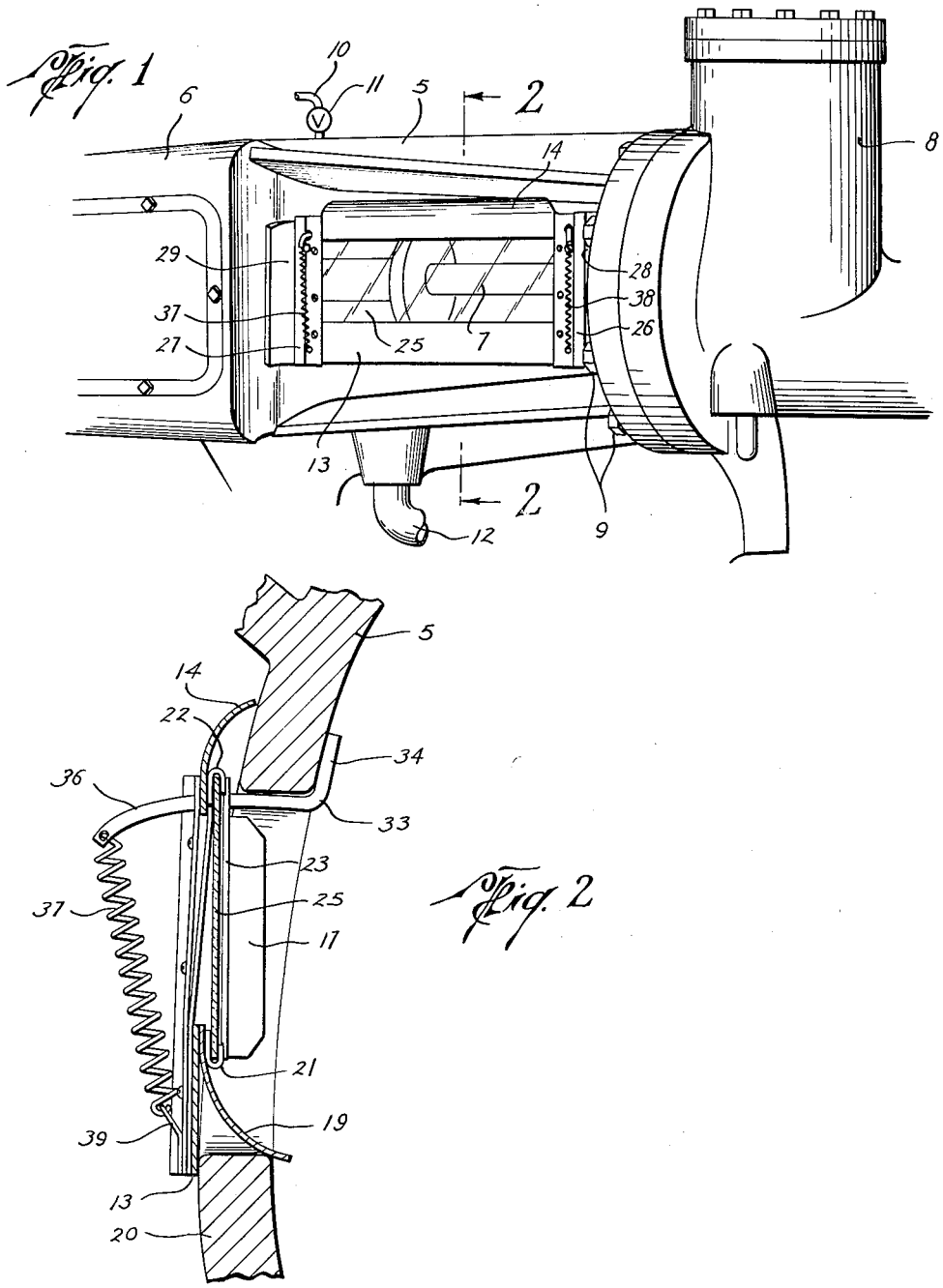
Glenn M. Russell
INVENTOR.
BY Browning & Simms
ATTORNEYS Feb. 21, 1956  G. M. RUSSELL  2,735,577
SHIELD FOR PUMP CRADLES
Filed Sept. 23, 1952  2 Sheets-Sheet 2
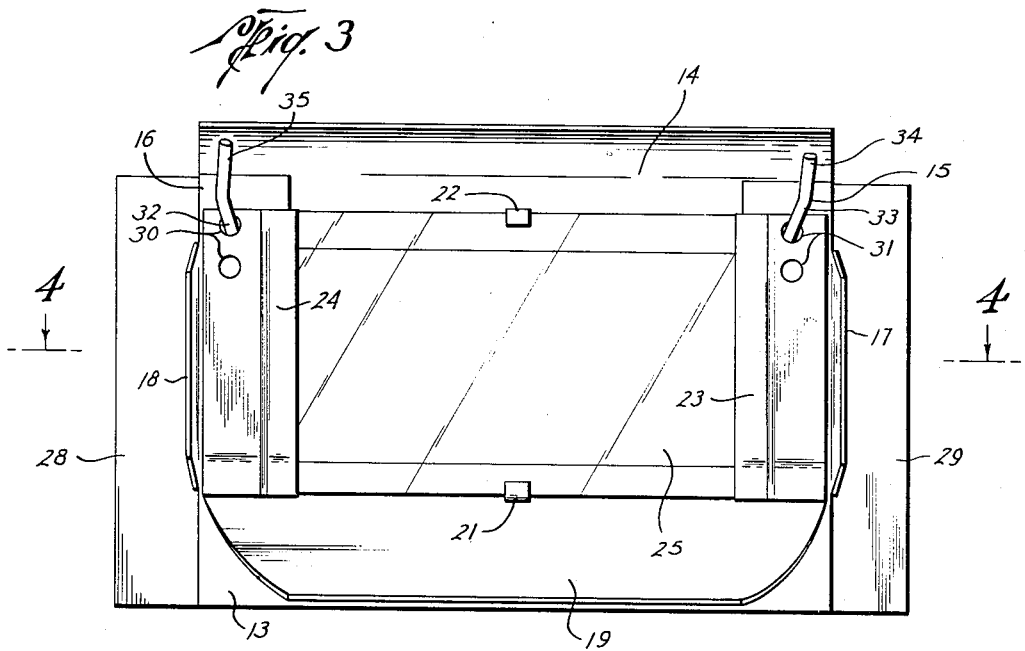
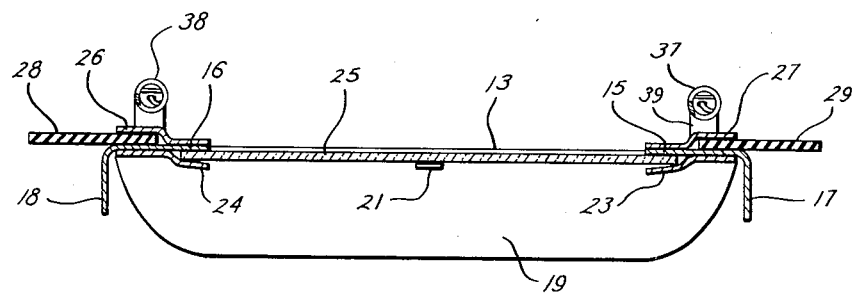
Glenn M. Russell
INVENTOR.
BY Browning & Simms
ATTORNEYS United States Patent Office 2,735,577
Patented Feb. 21, 1956

2,735,577

SHIELD FOR PUMP CRADLES

Glenn M. Russell, Teague, Tex.

Application September 23, 1952, Serial No. 310,951

8 Claims. (Cl. 220—55)

This invention relates to a readily removable shield for access openings and relates more particularly to a shield for cradle openings in reciprocating type pumps.

In large reciprocating high pressure pumps, such as are used in modern oil field drilling to pump drilling mud, it is not uncommon to operate with discharge pressures of many hundreds of pounds. Such pressures require elaborate stuffing boxes to seal the sliding connection between the connecting rod and the rear head of the pump cylinder. These stuffing boxes must receive constant attention in the form of frequent adjustments and periodic replacements if leakage along the connecting rod is to be prevented. The power end of the connecting rod may extend into a gear housing in which rotary motion from a prime mover is transformed to longitudinal movement of the crank shaft. The mechanism within such housing may be lubricated by an oil bath and positive flow lubrication system. To prevent flow of the lubricant from the gear housing along the connecting rod, a stuffing box may be provided at the entrance of the connecting rod into the gear housing. This stuffing box may also require periodic attention.

In order that the two stuffing boxes, and in particular the stuffing box about the connecting rod at the pump cylinder, will have increased life, it is desirable to provide a positive lubrication system for the connecting rod. One of the difficulties encountered in providing such a system is that the cradle opening allowing quick access to the stuffing boxes also allows intrusion of debris, such as dirt, mud, sand, bugs, etc. into the cradle thereby fouling the polish surface of the connecting rod and reducing the efficiency of the lubricating system therefor.

It is therefore an object of this invention to provide a shield in the form of a latching cover plate for a pump cradle opening to prevent debris from entering into the cradle, which shield is quickly and easily removable so as to present a minimum of interference with access to a stuffing box within the cradle.

It is another object of this invention to provide a latch mechanism in combination with a cover plate to permit the cover plate to be removed from a pump cradle with a minimum of time and effort and without removing any separable parts, such as nuts or studs, which might be mislaid and lost.

It is a further object of this invention to provide a latch mechanism for a cover plate which is operable with various sizes and shapes of cradle openings and cradle wall thicknesses.

It is a further object of this invention to provide a latch for a cover plate for a pump cradle opening which has a minimum of moving parts none of which must be completely separated or removed from the cover plate in order that the latter may be disengaged from the cradle, the latch being further constructed as to avoid sticking and contamination of its parts by debris or lubricating compounds.

Another object is to provide such a shield or cover plate and latch in combination with a baffle which not only serves its purpose as such but also as a part of an engaging means for positively positioning the shield in a pump cradle opening.

Other objects and advantages of this invention will become apparent from the following description taken in connection with the accompanying drawings wherein there is set forth by way of illustration and example one embodiment of the invention.

In the drawings:

Fig. 1 is an isometric elevation of a pump cradle showing a shield embodying this invention over the cradle opening;

Fig. 2 is a fragmentary section on an enlarged scale taken along the line 2—2 of Fig. 1 illustrating the manner of securing the shield over the cradle opening;

Fig. 3 is an isometric elevation of the shield illustrating details thereof; and Fig. 4 is a view taken along the line 4—4 of Fig. 3 further illustrating the details of the shield.

Referring now more particularly to the drawings, the numeral 5 indicates a pump cradle extending from a gear housing 6 which contains the power transmitting mechanism between the connecting rod 7, and the prime mover not shown. Cradle 5 is secured to pump housing 8 by studs 9 or any other suitable securing means. Tapped in to the upper portion of cradle 5 is a conduit 10 having a valve 11 for delivering a lubricant to the cradle. The lubricant from conduit 10 is collected in the lower portion of the cradle after lubricating the connecting rod and drained off by conduit 12.

Referring to the shield, there is provided a cover plate of a size as to extend substantially across the cradle opening and comprising a lower base member 13, an upper base member 14 and end members 15 and 16, all arranged in a rectangular configuration as shown and defining a central opening. Upper base member curves inwardly as shown in Fig. 2 to provide a line contact along its upper edge with the outer surface of the cradle 5 above the cradle opening. The upper base member is preferably formed of a material, such as sheet metal, so as to have sufficient resiliency that its upper edge will abut the cradle 5 regardless of the degree of curvature of the cradle adjacent to and above the cradle opening. End members 15 and 16 carry inwardly extending flange portions 17 and 18, respectively, which may be bent to fit the contours of the individual cradle opening. Such flange portions are likewise made of a material having some resiliency so that they can press outwardly against the front and rear edges of the cradle opening to effect a seal therewith.

Provided as a part of a cover plate assembly and attached to the lower part of the cover plate is a baffle 19 which is gently curved away from and connected to lower base member 13 to not only provide a deflector for lubricants splashed against the cover plate so as to return them to the sump portion of the cradle, but also to act with the lower base member in providing a means for releasably engaging the lower edge of the cradle defining the cradle opening. The cover plate assembly is thus provided with a portion adapted to achieve this function of releasable engagement in a very facile manner permitting very rapid removal and replacement of the assembly.

Clips 21, 22, 23 and 24 are carried by the assembly and have laterally offset portions which cooperate with lower base member 13, upper base member 14, end member 15, and end member 16, respectively, to provide channels in which is secured a transparent member 25 which completely covers the central opening between the upper and lower base member and the end members. This transparency provides a visual inspection port for the lubricating system and the stuffing boxes about the connecting rod.

Clips 26 and 27 are attached to end members 16 and 15, respectively, and each has a laterally offset portion which cooperates with its supporting end member to provide a channel for receiving and retaining resilient seal flaps 28 and 29, respectively. These flaps can be fabricated of any suitable material such as rubber, neoprene being preferred. The flaps lie against the outer face of cradle 5 when the shield is in position and aid in keping out debris.

Passing through and having a loose sliding fit with apertures 30 and 31 are rods 32 and 33, respectively. The rods extend transversely to either side of the cover plate assembly and one end of each of these rods is preferably bent upwardly to provide hooked portions 34 and 35 which engage the inner surface of the upper edge of the cradle opening. The other ends of the rods can be curved in an opposite direction as at 36 and carry resilient elements in the form of tension springs 37 and 38 which are attached at their free ends to angle members 39 and hence to the cover plate assembly. These springs exert a constant pressure downwardly on the rod ends 36 to thereby bias the ends 34 and 35 of the rods away from the portion of the cover assembly in engagement with the lower edge of the cradle opening.

The apertures for the rods are sufficiently small so that with the shield removed from the cradle openings, the apertures act as fulcrums for the rods, the latter pivoting about such fulcrums under the influence of the springs to assume an angular position with respect to the cover plate assembly so as to bind themselves in the apertures. This binding prevents endwise movement of the rods thereby holding them in position for rapid attachment of the shield to the pump cradle. While the apertures are small enough to bind the rods as above disclosed, they are yet large enough relative to the rods that the latter can be moved endwise by manually pivoting them from their angular position at which they bind with the apertures to an angular position more nearly normal to the cover plate assembly. This permits pulling and pushing the rods to secure tight engagement between hooks 34 and 35 and the inner cradle wall. The rods and their apertures are spaced from the portion of the cover assembly engaging the lower edge of the cradle opening, e. g. member 13 and baffle 19, such that with the shield in place, the angular position of the rods is more nearly normal to the cover assembly than when they are moved to bind in the apertures. With this spacing then, the springs tend to force the ends of the rods bearing hooks 34 and 35 upwardly into tight engagement with the upper edge of the cradle opening which, in turn, tends to force the member 13 and baffle 19 downwardly also into a tight engagement with the lower edge of the cradle opening.

While the above-described arrangement is preferred, it is believed apparent that rods 32 and 33 might be straight along their ends engaging the cradle instead of curved as at 34 and 35 so as to maintain a frictional contact with the upper edge of the cradle opening. Also the curve 36 might be dispensed with and a straight rod suffice but the arrangement shown is preferred as it provides a more positive engagement with the cradle.

A plurality of vertically spaced apertures 30 and 31 are provided to permit adjusting the rods to the size of the cradle opening so that the rods can be fulcrumed at different points in the cover plate. It will be appreciated that with this arrangement, a single size shield can be utilized within a larger range of cradle opening sizes.

The operation of the device is believed to be obvious from the foregoing description. End extensions 17 and 18 are bent inwardly to conform to the sides of the cradle opening and if desired may be slightly larger so as to provide a frictional engagement therewith when the shield is mounted. Rods 32 and 33 are then biased so that baffle 19 and the engaging portions 34 and 35 of rods 32 and 33 will pass through the cradle opening. After the cover plate has been pushed firmly against the cradle until the upper and lower base members are engaged therewith, and the lower baffle plate extends inwardly into the cradle opening, the rods 32 and 33 may be withdrawn endwise relative to the cover plate until the outwardly turned portions 34 and 35 engage the inner face of the upper cradle edge. In this manner the shield will be held firmly against the cradle opening by the frictional engagement of the baffle plate 19 and of the two end plates 17 and 18 and the rods 32 and 33. It will be noted that the thickness of the upper lip of the cradle opening will not affect the latch mechanism and standard parts may be used for different make and size pumps.

To remove the shield, it is only necessary to lift up on rods 32 and 33 thereby extending tension springs 37 and 38 until the engaging portions of the rods clear the upper edge of the cradle opening and the shield may then be withdrawn from the cradle opening.

It is understood that one rod would hold the cover plate in position but two or more are preferred. The engaging rod might also engage the sides or the bottom of the opening in the cradle instead of the top and work satisfactorily.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A removable shield for covering a pump cradle opening which comprises, in combination, a cover plate assembly of a size as to substantially extend across the cardle opening and including a portion adapted to releasably engage one edge of the cradle opening, a rod having a loose sliding engagement with said assembly and extending transversely to either side thereof, resilient means between one end of said rod and said assembly to bias the other end of the rod away from said engaging portion of the assembly, said rod being remote from said engaging portion and situated as to have its said other end engage an edge of said cradle opening opposite said edge engaged by said portion.

2. A removable shield for covering a pump cradle opening which comprises, in combination, a cover plate assembly of a size as to substantially extend across the cradle opening and including a portion adapted to releasably engage one edge of the cradle opening, a rod having a loose sliding engagement with the assembly and extending through an aperture in said assembly and transversely to either side thereof, resilient means between one end of said rod and said assembly to bias the other end of the rod away from said engaging portion of the assembly, said aperture being of a size such that with the shield removed from said cradle opening, endwise movement of the rod by the resilient means is prevented by the rod pivoting to an angular position with respect to the assembly such that it binds in said aperture, the rod and its aperture being sufficiently spaced from said engaging portion that with the shield in place on said cradle and with said other end of the rod engaging an edge of the cradle opening opposite that engaged by said portion, the angular position of the rod with respect to the assembly in then more nearly normal thereto than when in said binding position.

3. A shield for a pump cradle opening comprising, a cover plate, means at one extremity of the cover plate for releasably engaging the cradle, an aperture in the cover plate adjacent a second extremity and remote from said engaging means, a rod slidably extending through said aperture, resilient means connected between one end of said rod and the cover plate biasing the other end of the rod away from said engaging means and tending to bind the rod in the aperture.

4. The apparatus of claim 3 wherein said other end of the rod is bent to extend away from said engaging means to act as a hook to facilitate engagement with the edge of the cradle opening.

5. The apparatus of claim 4 wherein the means for releasably engaging the cradle is an elongate curved baffle plate extending to the same side of the cover plate as said other end of said rod and adapted to lie within the cradle opening and engage one edge thereof.

6. The apparatus of claim 5 wherein the cover plate is of rectangular configuration, the baffle plate and aperture are located at opposite extremities of the cover plate and resilient sealing means are carried by the other two extremities with exposed sealing surfaces on the same side of the cover plate as the baffle plate for sealing engagement with a cradle opening.

7. The apparatus of claim 3 wherein the cover plate has a view port fabricated of transparent material.

8. A shield for a pump cradle opening comprising a cover plate of rectangular configuration, a baffle attached to the cover plate and adjacent one extremity thereof and curving from the cover plate, a plurality of apertures adjacent the opposite extremity of the cover plate, rods loosely and slidably fitting in said apertures, each of said rods having one end bent in a direction away from the baffle to provide an engaging hook, springs connected between said rods and the cover plate tending to bind each rod in its aperture, flanges and overlying resilient members on the remaining two sides of the cover plate, and a view port in said cover plate.

References Cited in the file of this patent

UNITED STATES PATENTS

| | | |
|---|---|---|
| 849,618 | Hurlburt | Apr. 9, 1907 |
| 1,583,257 | Riggs | May 4, 1926 |
| 1,642,612 | Haarberg | Sept. 13, 1927 |

FOREIGN PATENTS

| | | |
|---|---|---|
| 487,959 | France | May 17, 1918 |